United States Patent [19]
Keiichi et al.

[11] 4,157,581
[45] Jun. 5, 1979

[54] HAND-OPERATED BULK ERASER FOR MAGNETIC TAPE CASSETTES

[75] Inventors: Yoshizawa Keiichi, Tokyo; Yamakawa Kokichi, Machida, both of Japan

[73] Assignee: TDK Electronics Co., Ltd., Tokyo, Japan

[21] Appl. No.: 827,363

[22] Filed: Aug. 24, 1977

[30] Foreign Application Priority Data

Sep. 1, 1976 [JP] Japan ............................ 51/116192[U]

[51] Int. Cl.² ............................................. H01F 13/00
[52] U.S. Cl. ............................. 361/267; 179/100.4 M; 360/66
[58] Field of Search ....................... 361/149, 151, 267; 179/100.4 M; 360/66

[56] References Cited

U.S. PATENT DOCUMENTS

| | | | |
|---|---|---|---|
| 2,481,392 | 9/1949 | Camras | 361/267 |
| 3,660,727 | 5/1972 | Ohira et al. | 361/267 |
| 3,711,750 | 1/1973 | Huffman et al. | 361/267 |

FOREIGN PATENT DOCUMENTS

1577334  6/1969  France ................................. 361/267

OTHER PUBLICATIONS

*IBM Tech. Disc. Bull.*, vol. 18, No. 1, Jun. 1976, "Bulk Eraser" by Bate et al., pp. 51–52.

*Primary Examiner*—Gerald Goldberg
*Attorney, Agent, or Firm*—Burgess, Ryan and Wayne

[57] ABSTRACT

A magnetic bulk eraser for erasing a cassette magnetic recording tape. A pair of parallel magnetic disks have alternating magnetic poles around their peripheral surface. The disks are mounted facing each other, and are so aligned that the facing poles are similar, e.g. North faces North, and South faces South. A guide slot through which a cassette magnetic tape may be passed is provided between the magnet disks. A holder having a cassette magnetic tape to be erased moves linearly through the guide slot engaging a rack with pinions. When a handle is rotated manually, the magnetic disks rotate and provide an alternating magnetic flux in the guide slot through which a cassette magnetic tape passes, also driven by the manually operated handle.

8 Claims, 11 Drawing Figures

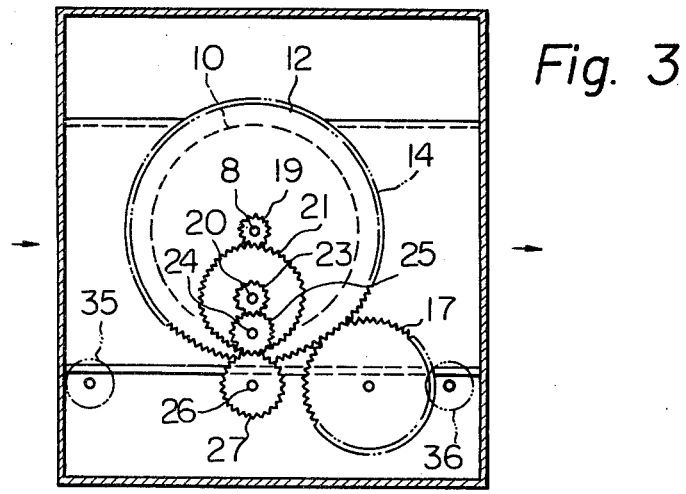
Fig. 3
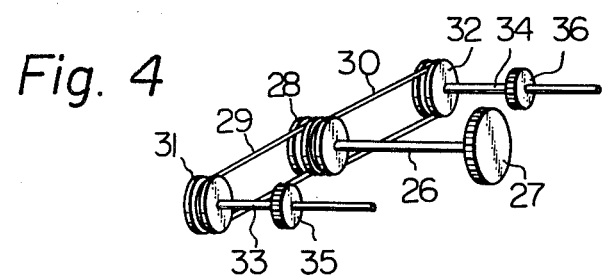
Fig. 4
Fig. 5(A)   Fig. 5(B)   Fig. 5(C)
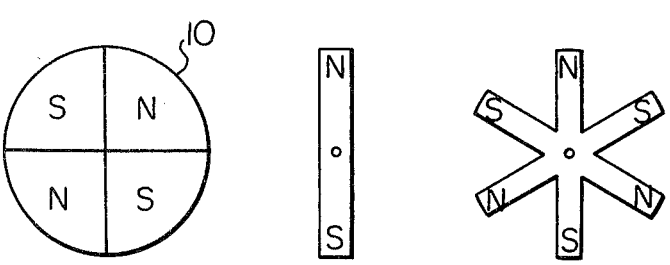

४,१५७,५८१

HAND-OPERATED BULK ERASER FOR MAGNETIC TAPE CASSETTES

BACKGROUND OF THE INVENTION

The present invention relates to a magnetic eraser, in particular, relates to a magnetic bulk eraser which can erase the magnetic recording on a plurality of magnetic cards, a plurality of magnetic sheets, or a reel of magnetic tape in a short time with an alternating magnetic field.

When we want to erase a magnetic recording on a magnetic tape, or any other magnetic recording medium, the magnetic tape must be positioned in an alternating magnetic field, the strength of which is greater than the maximum magnetic flux density of the hysteresis loop, and the strength of the field is then gradually reduced. Or the magnetic tape must pass through the area where said strength of magnetic field is applied so that the tape receives a gradually reducing flux. The magnetic medium is erased by the process that the B-H curve changes from the maximum hysteresis loop to a minor loop and the residual magnetic flux density reaches zero. A magnetic tape can be erased by running the tape through the erasing magnetic field in order to apply a gradually reducing magnetic flux to the tape. But this process takes a long time. Therefore, a bulk magnetic eraser which can erase the magnetic medium without running the tape but just by putting the reel of tape in the erasing field is preferable. Accordingly, the present invention relates to the structure of a bulk eraser.

A prior magnetic bulk eraser utilized an electromagnet excited by an alternating current. When the magnetic medium to be erased is for instance a chromium oxide type magnetic medium, the coercive force of which is very large, a strong erasing flux of more than 1000 gauss is necessary. Therefore, an apparatus for generating such a strong flux is very bulky. Accordingly, a prior magnetic bulk eraser has been used only in tape manufacturing factories, tape copy factories and/or studios, but is not practical for home use.

SUMMARY OF THE INVENTION

The general purpose of the present invention is to provide a small size bulk eraser which does not use an electromagnet; in particular to provide such an eraser using a permanent magnet.

It is an object, therefore, of the present invention to overcome the disadvantages and limitations of a prior magnetic bulk eraser by providing a new and improved magnetic bulk eraser.

The above and other objects are attained by a magnetic bulk eraser having a pair of permanent magnet disks rotatably mounted on their axes, and so aligned that their facing magnetic poles are similar, a guide slot through which a magnetic medium may be passed is provided between said permanent magnet disks, and means for rotating said magnetic disks and moving linearly a magnetic medium through said guide slot driven by a manually operated handle. The rotation of said permanent magnet disks provides an alternating magnetic flux in said guide slot. When a magnetic medium mounted in a holder goes through said guide slot slowly, the magnetic medium receives a gradually reducing magnetic flux from the rotating permanent magnet disks. As the total magnetic flux is equal to the sum of the fluxes of both magnetic disks, a strong magnetic flux is obtained although the magnetization of each magnetic pole is not so strong.

BRIEF DESCRIPTION OF THE DRAWINGS

The foregoing and other objects, features, and attendant advantages of the present invention will be appreciated as the same become better understood by means of the following description and accompanying drawings wherein;

FIG. 3 is the right side view at the line III—III in FIG. 1;
FIG. 4 is the perspective view showing the transmission means according to the present invention;
FIG. 5(A), FIG. 5(B) and FIG. 5(C) show some embodiments of a magnet according to the present invention.

DESCRIPTION OF THE PREFERRED EMBODIMENT

Figure 1:
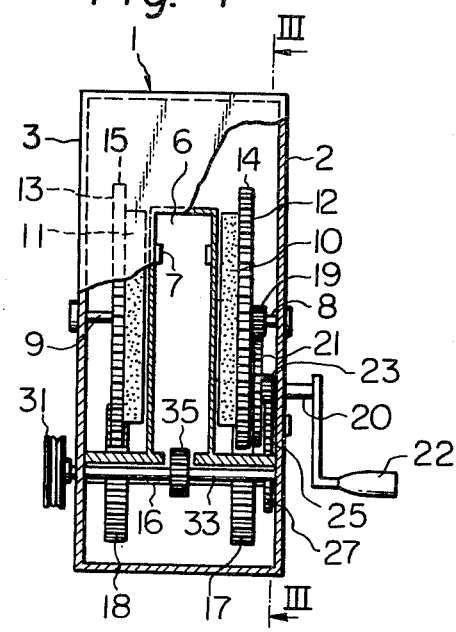
FIG. 1 is the front view of the present eraser.

FIG. 1 shows the front view of the present magnetic eraser. The housing 1 is a rectangular hollow box made of plastics and has a right wall 2, a left wall 3, a front wall 4, a rear wall 5 and a pair of top and bottom walls. The guide slot 6 extends from the front wall 4 to the rear wall 5 through the center of the housing 1. At the side walls of the guide slot 6, a pair of guide rails 7 are provided for guiding a cassette tape holder.

A pair of axes 8 and 9 are rotatably mounted between the right wall 2 and the left wall 3 near the vertical and horizontal center of the guide rails 6. The axes 8 and 9 have magnet disks 10 and 11, (as shown in FIG. 5(A)) and magnetic shields 12 and 13, respectively, at the extreme end of each axis. The magnetic shield is made of soft magnetic material with high permeability. The inner surfaces of the magnet disks 10 and 11 are mounted with a small gap between them and the side wall of the guide slot 6 so that the magnet disks 10 and 11 can rotate freely. The magnet disks 10 and 11 induce a magnetic flux of 1000–1400 gauss in the guide slot 6. The material of the magnet disks is for instance rare earth type, or barium type ferrite magnet, or any other known material. Each magnet disk is magnetized so that the N-poles and S-poles appear alternately. The number of magnetic poles is for instance four around the periphery of the magnet disk. The same magnetic poles, N and N, and S and S of the pair of disks coincide with each other.

The magnetic shield 12 and 13 prevent the leakage of magnetic flux from the magnet disks 10 and 11 which would transmit undesirable magnetic flux to external apparatus, and strengthen the magnetic flux in the guide slot 6. The diameter of the magnetic shields 12 and 13 is a little larger than that of the magnet disks 10 and 11. The magnetic shields 12 and 13 have gear teeth 14 and 15 on the periphery of the same, and the gears engage with the gears 17 and 18 on the axis 16. Accordingly, when the magnetic shield 12 and magnet disk 10 rotate, the other magnetic shield 13 and magnet disk 11 also rotate receiving revolutional power through the gear 14, gear 17, axis 16 and gear 18. Thus, a pair of magnet disks 10 and 11 rotate with their similar magnetic poles always facing each other. Therefore, there is always a magnetic flux provided parallel to the vertical plane extended the whole length of the guide slot 6.

The magnet disks 10 and 11 receive the rotational torque as follows. The gear 19 is fixed on the axis 8, and said gear 19 engages with the large gear 21 which is fixed on the axis 20. When the handle 22 is rotated, the revolution of the axis 20 is transmitted to the small gear 19 through the gear 21. And thus the number of revolutions is increased. Thus, the magnetic shield 12 and the magnet disk 10 rotate at high speed. The rotation of the magnetic shield 12 and the magnet disk 10 causes the rotation of the other magnetic shield 13 and the magnet disk 11 in the same rotational direction. As is apparent from the above explanation, an alternating magnetic flux which is equivalent to the magnetic flux induced by an altenating electric current is induced in the guide slot 6.

Figure 2:
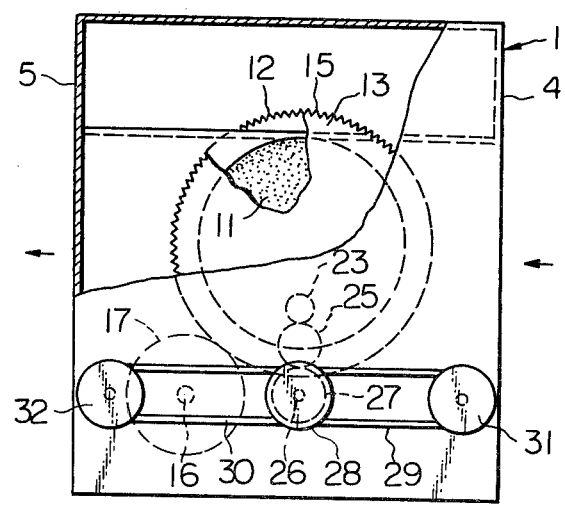
FIG. 2 is the left side view of the same.

Next, means for transporting a magnetic tape mounted in a tape holder through the guide slot 6 will be explained. The tape holder for mounting the magnetic tape will be described later with reference to FIGS. 7, 8 and 9. The drive spindle 20 has a further gear 23, which engages with the intermediate gear 25 fixed on the axis 24, and said intermediate gear 25 engages with the gear 27 fixed on the axis 26. The axis 26 extends to the outside of the housing 1 through the left wall 3 and has a pulley 28 which has a V-shaped groove. The pulley 28 is connected with other pulleys 31 and 32 via the belts 29 and 30, the diameter of the pulleys 31 and 32 is the same as that of the first pulley 28. Thus, pulleys 28, 31 and 32 rotate at the same rotational speed. The pulleys 31 and 32 are fixed on the axes 33 and 34 respectively, and the axes 33 and 34 have pinions 35 and 36 at the center portion of those axes, as shown in FIG. 2 and FIG. 4. A part of the pinions 35 and 36 is projected upward through the bottom of the guide slot 6 as shown in FIG. 1 and FIG. 3. When the handle 22 is rotated in the clock-wise direction, the pinions 35 and 36 are rotated in the same direction through the transmission gears mentioned above, and then the tape holder having a rack engaging with the pinions 35 and 36 is transported from the front wall 4 to the rear wall 5.

FIGS. 5(A), 5(B), and 5(C) show some embodiments of the magnets 10 and 11. FIG. 5(A) is the magnet disk having four magnetic poles explained above. FIG. 5(B) is another embodiment of the magnet which has three bar magnets, and FIG. 5(C) composes a single bar magnet. The embodiments in FIG. 5(B) and FIG. 5(C) can operate substantially the same as FIG. 5(A) does.

Figure 6:
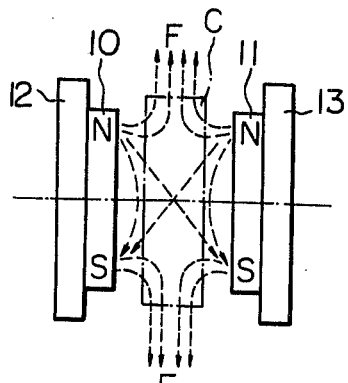
FIG. 6 shows the magnetic flux induced from the magnets according to the present invention.

FIG. 6 shows the magnetic flux induced by the magnet disks of FIG. 5(B) in detail. As mentioned above, the N-poles and S-poles on the magnet disk 10 coincide with the N-poles and S-poles on the other magnet disk 11 respectively as shown in FIG. 6. Therefore, the magnetic flux induced by those poles is shown in the dotted line F in FIG. 6. Since the magnetic flux F has a strong vector in the vertical direction, the present eraser is very effective for bulk erasing of a magnetic tape.

Figure 7:
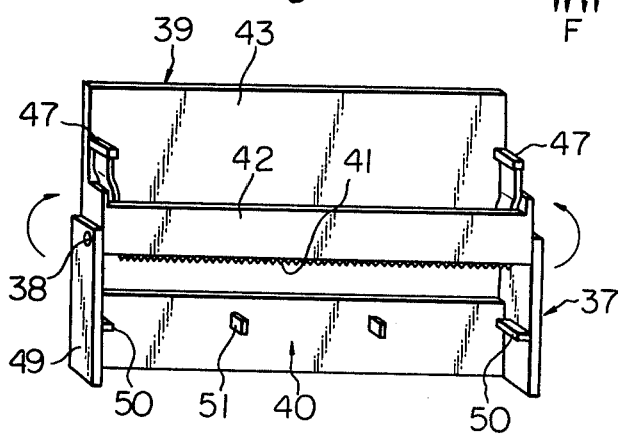
FIG. 7 is the perspective view of a holder of the invention.
Figure 8:
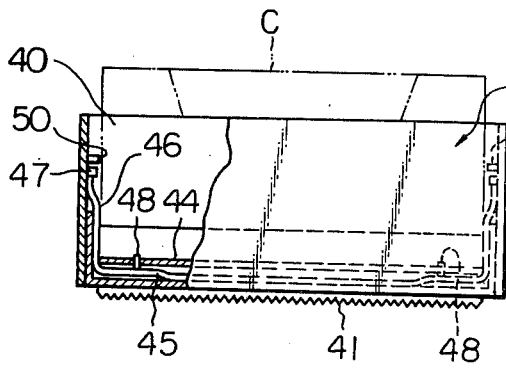
FIG. 8 is a partial cross section of the holder in FIG. 7.
Figure 9:
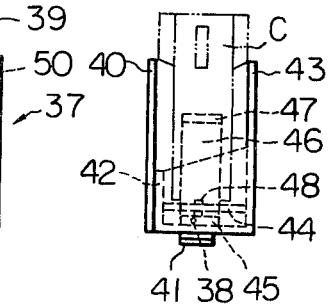
FIG. 9 is the side view of the holder in FIG. 7.

Now, a tape holder for mounting a cassette tape and transporting the same through the guide slot 6 will be explained in accordance with FIGS. 7, 8 and 9. Wherein FIG. 7 shows the open position of the holder, FIG. 8 shows the closed position of the holder having a cassette tape C, and FIG. 9 is the side view of FIG. 8. The holder 37 has a case 39 and a cover 40 which is connected to the case 39 by pins 38. In a closed position, the upper level of the case 39 is the same as the upper level of the cover 40 as shown in FIG. 8, and those upper levels are guided by the guide rail 7 when the holder is inserted in the guide slot 6. The case 39 has the rack 41 which can engage with the pinions 35 and 36 at the bottom of the case 39. The case 39 has a low wall 42 which provides a pocket with the back wall 43, and said pocket receives a cassette tape. The present tape holder has an erasing protect means. As shown in FIG. 8, said pocket has a plate 44 near the bottom portion of the pocket, and said plate 44 divides the pocket to two sections. A spring 45 is inserted in the bottom section in the pocket, and the spring 45 has a pair of extensions 46 in a vertical direction at the extreme of the same. At the extreme ends of the extensions 46, there is provided a stopper 47 as shown in FIG. 7. The spring 45 has, further, a pair of projections 48, which project into the pocket through the plate 44. The pair of projections 48 engage with the so-called erasing protect lugs of a cassette tape shell. When a cassette tape shell C whose erasing protect lugs have been removed, is inserted into the present holder 37, the projections 48 enter into the holes of the removed erasing protection lugs, and so the stopper 47 remains the original position (outside the pocket). When the erasing protect lug is not removed, the projection 48 and the stopper 47 are pushed down by the insertion of the cassette tape shell. Further, a projection 50 is provided on the end wall 49 of the cover 40, and the position of the projection 50 is so designed that the projection 50 engages with the stopper 47 when the stopper 47 is in the upper position. Accordingly, the cover 40 can only be closed when the erasing protect lug is not removed or something is inserted in the hole of the erasing protect lug. It should be appreciated that the holder can not be inserted into present eraser unless the holder is closed. Thus, the present eraser has protection against mis-erasing.

Further, the present holder has the other projections 51 which engage with a pair of center holes of a cassette tape when the cassette tape is inserted in the case 39. Said projections 51 are provided inside of the cover 40 as shown in FIG. 7. The projections 51 prevent the rotation of a tape during the erasing operation, and thus prevent the presence of un-erased portions due to loose tape. When the cover 40 closes the case 39, the projections 51 engage automatically with the driving projections in the hole of a cassette tape shell.

In operation, an operator inserts a cassette shell C with a magnetic tape to be erased in the holder 37, closes the holder 37 and inserts the holder 37 into the guide slot 6 from the entrance side (front wall 4). Then the rack 41 of the holder 37 engages with the pinion 35 by the weight of the holder itself. Rotating the handle 22 in the clock-wise direction, the manget disks 10 and 11 rotate at high speed in the synchronized condition, and the pinions 35 and 36 rotate slowly. Thus, the holder 37 and the cassette shell mounted in the holder moves slowly on the pinion 35 in the guide slot 6 in which a high speed alternating magnetic flux is induced. The movement of the cassette shell is relayed to the pinion 36 and the cassette shell is ejected from the exit (rear wall 5).

The experiment shows that about twenty revolutions of the magnet disks 10 and 11 during the movement of the holder in the guide slot 6 are enough for completely erasing a magnetic tape, when the magnetic disks shown in FIG. 5(A) are utilized. In that case, the magnetic poles alternate eighty times (20×4=80). According to the present invention, each part of a magnetic tape is subjected to the maximum magnetic flux (1000-1400 gauss), and the intensity of the magnetic flux applied to a magnetic tape is gradually decreased. Therefore, a magnetic tape is completely erased.

As is apparent from the above explanation, a magnetic tape in a cassette shell is completely erased. It is a matter of course that the present invention can be applicable to the erasing of a magnetic card and/or magnetic sheet, just by changing the structure of the holder.

From the foregoing it will now be apparent that a new and improved magnetic bulk eraser has been found. It should be understood of course that the embodiment disclosed is merely illustrative and is not intended to limit the scope of the invention. Reference should be made to the appended claims, therefore, rather than the specification as indicating the scope of the invention.

The reference numerals referred to in the specification are listed below.

| | | | |
|---|---|---|---|
| 1: | housing | 2: | right wall |
| 3: | left wall | 4: | front wall |
| 5: | rear wall | 6: | guide slot |
| 7: | guide rail | 8: | axis |
| 9: | axis | 10: | magnet disk |
| 11: | magnet disk | 12: | shield |
| 13: | shield | 14: | gear |
| 15: | gear | 16: | axis |
| 17: | gear | 18: | gear |
| 19: | gear | 20: | drive spindle |
| 21: | gear | 22: | handle |
| 23: | gear | 24: | axis |
| 25: | intermediate gear | 26: | axis |
| 27: | gear | 28: | wheel |
| 29: | belt | 30: | belt |
| 31: | wheel | 32: | wheel |
| 33: | revolutional axis | 34: | revolutional axis |
| 35: | pinion | 36: | pinion |
| 37: | holder | 38: | pin |
| 39: | case | 40: | cover |
| 41: | rack | 42: | low wall |
| 43: | back wall | 44: | plate |
| 45: | spring | 46: | extension |
| 47: | stopper | 48: | projection |
| 49: | end wall | 50: | projection |
| 51: | projection | | |

What is claimed is:

1. A magnetic bulk eraser for magnetic tape, comprising:
   axle means defining a rotational axis,
   a pair of parallel circular disks coaxially and rotatably mounted on said axle means, each disk having a plurality of permanent magnetic poles on the periphery thereof, so aligned that the facing magentic poles are of like polarity,
   an enclosure having a guide slot through which a magnetic medium may be passed, said guide slot extending between said disks perpendicular to the rotational axis defined by said axle means,
   a holder for a magnetic storage element,
   a drive means with a manually operated handle and including a gear mechanism for rotating said circular disks at high speed, and
   transmission means coupled between said drive means and said means for transporting the holder for changing the ratio of the angle through which the handle is rotated to the linear movement of the holder to provide synchronized movement between the rotation of the disks and the linear transportation of the holder.

2. A magnetic bulk eraser according to claim 1, wherein said holder has a rack, and said means for transporting the holder is a pinion.

3. A magnetic bulk eraser according to claim 1, wherein said holder has a pocket for mounting a cassette magnetic tape and means for preventing the rotation of the tape in the holder.

4. A magnetic bulk eraser according to claim 1, wherein said holder comprises a case and a cover, and means for preventing the closing of the case when the erase protection lugs on the cassette are removed.

5. A magnetic bulk eraser according to claim 1, wherein a magnetic shield made of soft magnetic material with high permeability for preventing the leakage of the flux is disposed adjacent each magnetic disk.

6. A magnetic bulk eraser according to claim 1, wherein said guide slot has a pair of guide rails for guiding the movement of the holder.

7. A magnetic bulk eraser according to claim 1, wherein said magnet is a magnetic disk.

8. A magnetic bulk eraser according to claim 7, wherein each of the magnet disks has a pair of N-poles and a pair of S-poles.

* * * * *

UNITED STATES PATENT OFFICE
CERTIFICATE OF CORRECTION

Patent No. 4,157,581    Dated June 5, 1979

Inventor(s) Keiichi Yoshizawa, et al

It is certified that error appears in the above-identified patent and that said Letters Patent are hereby corrected as shown below:

In the title page, "Keiichi et al" should read --Yoshizawa et al--.

In the title page, under "Inventors", the names of the two inventors should read --Keiichi Yoshizawa-- and --Kokichi Yamakawa--, respectively.

Column 3, line 19:  "altenating" should be --alternating--.

Column 4, line 56:  "manget" should be --magnet--.

Column 6, line 7:   "magentic" should be --magnetic--.

Signed and Sealed this

Twenty-third Day of October 1979

[SEAL]

Attest:

RUTH C. MASON
Attesting Officer

LUTRELLE F. PARKER
Acting Commissioner of Patents and Trademarks

UNITED STATES PATENT OFFICE
CERTIFICATE OF CORRECTION

Patent No. 4,157,581  Dated  June 5, 1979

Inventor(s)  Keiichi Yoshizawa, et al

It is certified that error appears in the above-identified patent and that said Letters Patent are hereby corrected as shown below:

In Claim 1, between lines 13 and 14, insert the following:

--said guide slot having means for linearly transporting said holder--

Signed and Sealed this

Eleventh Day of December 1979

[SEAL]

Attest:

SIDNEY A. DIAMOND

Attesting Officer   Commissioner of Patents and Trademarks